(12) United States Patent
Goldman et al.

(10) Patent No.: US 8,054,706 B2
(45) Date of Patent: Nov. 8, 2011

(54) SENSOR PROTECTION USING A NON-VOLATILE MEMORY CELL

(75) Inventors: Phillip Mark Goldman, Dayton, MN (US); Muralikrishnan Balakrishnan, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 464 days.

(21) Appl. No.: 12/407,560

(22) Filed: Mar. 19, 2009

(65) Prior Publication Data
US 2010/0241787 A1    Sep. 23, 2010

(51) Int. Cl.
*G11C 7/02* (2006.01)
(52) U.S. Cl. .................. 365/209; 365/225.7; 365/225.5; 365/148; 365/100
(58) Field of Classification Search .................. 365/209, 365/225.7, 225.5, 148, 100
See application file for complete search history.

(56) References Cited

U.S. PATENT DOCUMENTS

| 6,584,029 | B2 * | 6/2003 | Tran et al. .................. 365/225.7 |
| 7,119,995 | B2 | 10/2006 | Granstrom et al. |
| 7,151,654 | B1 | 12/2006 | Mao et al. |
| 7,389,577 | B1 | 6/2008 | Shang et al. |
| 2005/0141143 | A1 | 6/2005 | Ono et al. |
| 2006/0146450 | A1 | 7/2006 | Beach et al. |

OTHER PUBLICATIONS

Muralikrishnan Balakrishnan, "Germanium Sulfide-Based Solid Electrolytes for Non-Volatile Memory," PhD Thesis, 2006, Arizona State University, Tempe.

* cited by examiner

*Primary Examiner* — Thong Q Le
(74) *Attorney, Agent, or Firm* — Fellers, Snider, et al.

(57) ABSTRACT

A method and apparatus for protecting an electrical device using a non-volatile memory cell, such as an STRAM or RRAM memory cell. In some embodiments, a memory element is connected in parallel with a sensor element, where the memory element is configured to be repetitively reprogrammable between a high resistance state and a low resistance state. The memory element is programmed to the low resistance state when the sensor element is in a non-operational state and reprogrammed to the high resistance state when the sensor element is in an operational state.

20 Claims, 4 Drawing Sheets

SENSOR PROTECTION USING A NON-VOLATILE MEMORY CELL

BACKGROUND

Data storage devices generally operate to store and retrieve data in a fast and efficient manner. Such devices often incorporate memory elements that can store data in a volatile or non-volatile manner. Volatile memory generally retains data only so long as power continues to be supplied to the device, whereas non-volatile memory continues to retain data in storage even in the application of operational power.

Memory elements can include a wide variety of different types of storage media, such as rotatable storage discs, semiconductor arrays of memory cells, etc. Storage discs are often accessed by transducers which operate to write and/or read back storage patterns to tracks along the discs. Such patterns can be magnetic, optical, magneto-optical, etc.

Due to the complexity of these and other types of electronic devices, it is often desirable to increase device reliability, particularly with regard to the efficiency of testing various electrical components during manufacture.

SUMMARY

Various embodiments of the present invention are generally directed to a method and apparatus for protecting an electrical device using a non-volatile memory cell, such as a RRAM memory cell.

In accordance with various embodiments, a memory element is connected in parallel with a sensor element, where the memory element is configured to be repetitively reprogrammable between a high resistance state and a low resistance state. The memory element is programmed to the low resistance state when the sensor element is in a non-operational state and reprogrammed to the high resistance state when the sensor element is in an operational state.

In other embodiments, a non-volatile memory element connected in parallel with a sensor element while the memory element is configured to be repetitively reprogrammable between a high resistance state and a low resistance state. The memory element is programmed to the low resistance state when the sensor element is in a non-operational state and reprogrammed to the high resistance state when the sensor element is in an operational state.

These and various other features and advantages which characterize the various embodiments of the present invention can be understood in view of the following detailed discussion and the accompanying drawings.

DETAILED DESCRIPTION

Figure 1:
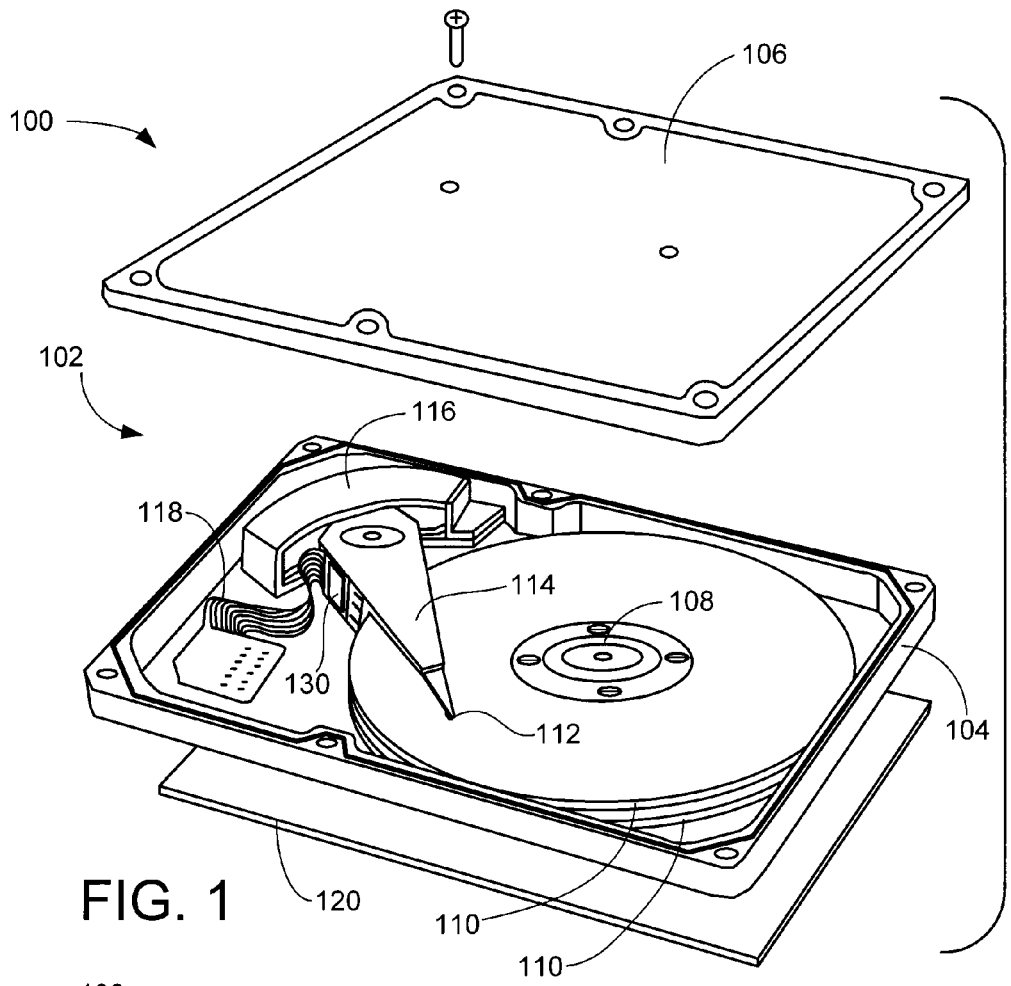
FIG. 1 is an exploded view of an exemplary data storage device constructed and operated in accordance with various embodiments of the present invention.

FIG. 1 shows an exploded view of a data storage device 100 to provide an exemplary environment in which various embodiments of the present invention can be advantageously practiced. The data storage device 100, also referred to herein as a data processing device, is of the type used to store and retrieve digital data in a computer system or network, consumer device, etc. It will be appreciated that various embodiments as presented herein can be used with other types of data processing devices, such as voice and/or data communication devices, information display systems, solid state and/or optical memory storage devices, etc.

The device 100 includes a rigid, environmentally controlled housing 102 formed from a base deck 104 and a top cover 106. A spindle motor 108 is mounted within the housing 102 to rotate a number of data storage media 110 (also "storage memory" or "discs") at a selected velocity.

Data are arranged on the media 110 in concentric tracks which are accessed by a corresponding array of data transducing heads 112 (transducers). Each head 112 and disc 110 combination defines a separate head-disc interface.

The heads 112 are supported by an actuator 114 and moved across the media surfaces by application of current to a voice coil motor, VCM 116. A flex circuit assembly 118 facilitates communication between the actuator 114 and control circuitry on an externally mounted printed circuit board, PCB 120.

Figure 2A:
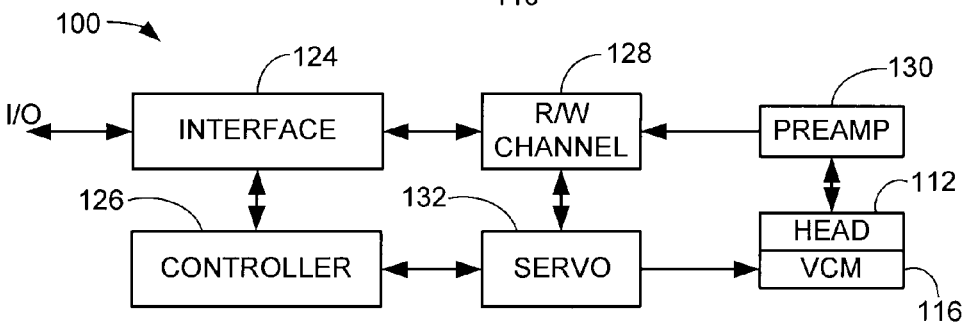
FIG. 2A is a generalized functional block diagram of the device of FIG. 1.

FIG. 2A generally shows a functional block diagram of the device 100 of FIG. 1. The device control circuitry preferably includes an interface circuit 124 which communicates with a host device using a suitable interface protocol. A top level processor 126 provides top level control for the device 100 and is characterized as a programmable, general purpose processor with suitable programming to direct the operation of the device 100.

A communication channel 128 (also referred to herein as a read/write channel) operates in conjunction with a preamplifier/driver circuit (preamp) 130 to write data to and to recover data from the discs 108. The preamp 130 is mounted to the actuator 114 within the interior environment of the housing 102, as shown in FIG. 1.

A servo circuit 132 provides closed loop positional control for the heads 112 and adjusts head position by applying the aforementioned control currents to the VCM 116. Data and control signals between the externally mounted PCB 120 and the internally mounted actuator 114 are passed via a bulkhead connector (not shown) and the flex circuit assembly 118 (FIG. 1).

Figure 2B:
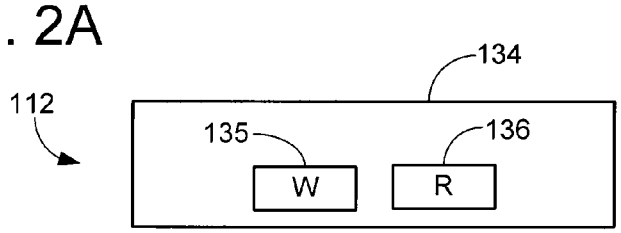
FIG. 2B sets forth a functional representation of a transducer of the device.

In some embodiments, the transducers 112 are characterized as magneto-resistive (MR) heads. As represented in FIG. 2B, each MR head 112 includes a slider 134 configured to be hydrodynamically supported adjacent the corresponding media surface by fluidic (e.g., air) currents established by high speed rotation of the media. The slider 134 supports a write (W) element 135 and a read (R) element 136.

The write element 135 takes a perpendicular recording inductive coil arrangement. Data are written to the media surface by using the servo circuit 132 (FIG. 2A) to position the write element 135 over the desired track, and passing write currents of alternating polarity from the preamp 130 to the write element 135 to establish magnetic flux transitions along the track representative of the stored data.

The MR read element 136 is configured to have a nominal resistance that varies when subjected to a magnetic field of selected orientation. Data are read back from the media surface by using the servo circuit 132 to position the MR read element 136 adjacent the stored data. The preamp 130 passes a small bias current through the MR read element 136, and the voltage across the MR element 136 is preamplified by the preamp 130 to provide a readback signal with pulses corresponding to the flux transition pattern.

In some embodiments, the MR read element 136 is fabricated in a semiconductor fabrication process. Because of the high levels of sensitivity of the MR read element 136, the element is susceptible to damage from electrostatic discharge (ESD) and electrical overstress (EOS) events during fabrication and device manufacturing. Accordingly, various embodiments of the present invention are generally directed to improving the reliability of an electronic device such as the storage device 100 by providing protection to sensors such as the MR read element 136 during non-operational modes.

Figure 3A:
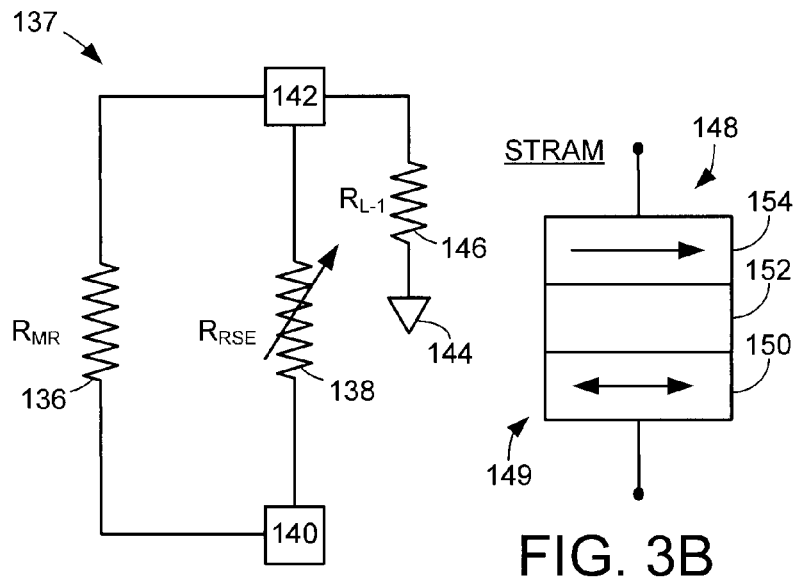
FIG. 3A generally illustrates a protection and access circuit in accordance with various embodiments.

FIG. 3A provides a high level representation of a protection and access circuit 137 constructed and operated in accordance with various embodiments. The circuit 137 includes the aforedescribed MR read element 136 (hereinafter "sensor") with an electrical resistance denoted as $R_{MR}$. The sensor 136 is connected in parallel with a resistive sense element (RSE) 138 with a resistance $R_{RSE}$. The RSE 138 is schematically depicted as a variable resistor, and generally comprises a non-volatile memory cell that can be repetitively reprogrammed between a low resistance ($R_L$) state and a high resistance ($R_H$) state.

First and second connection terminals (pads) are denoted at 140 and 142. The second connection terminal 142 includes a connection path to a reference level 144, such as electrical ground. The path includes a relatively small line resistance $R_{L-1}$, denoted by resistor 146.

The RSE 138 of FIG. 3A can take a number of forms. In some embodiments, the RSE 138 takes a spin-torque transfer random access memory (STTRAM or STRAM) configuration 148 as set forth by FIG. 3B. The STRAM cell 148 comprises a magnetic tunneling junction (MTJ) 149 that includes, but is not limited to, a free layer 150, a tunneling barrier 152, and a pinned layer 154. As spin polarized current passes through the cell 148, the free layer 150 will match the spin polarized magnetic phase. The bi-stable nature of the free layer 150 will allow either magnetic phase to be maintained until an opposing spin polarized current passes through the layer 150. In some embodiments, the free layer comprises a soft magnetic material.

The STRAM cell 148 can respectively take a high resistance state or a low resistance state based on the relationship of the magnetic phase of the free layer 150 to the pinned layer 154. When the free layer 150 and pinned layer 154 have matching (parallel) magnetic phase, the resistance of the memory cell will be low ($R_L$) and correspond to a first logical state, such as logical 0. By contrast, antiparallel magnetic phases for the free and pinned layers 150 and 154 indicated a high resistance ($R_H$) and the opposite logical state, such as logical 1. A switching device, such as an NMOSFET (not shown), can be provided in series with the MTJ 149 to facilitate selective access to the STRAM cell 148.

Figures 3B, 3C:
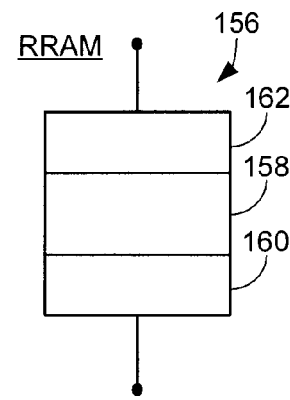
FIGS. 3B-3C provide alternative exemplary constructions for the resistive sense element memory cell of FIG. 3A.

In other embodiments the RSE 138 can take a resistive random access memory (RRAM) configuration 156 such as set forth in FIG. 3C. The RRAM cell 156 comprises an oxide layer 158 disposed between a first electrode layer 160 and a second electrode layer 162. The oxide layer 158 normally has a relatively high resistance ($R_H$) state. Application of a suitable write voltage across the cell 156, however, promotes metal migration from one or more of the electrode layers 160, 162 to form a conductive filament through the oxide layer 158, placing the cell in a low resistance (RL) state. As with the STRAM cell 148 discussed above, the high and low resistance states correspond to predetermined logical states, such as logical 1 and logical 0. A switching device can also be provided in series as desired to facilitate selective access to the RRAM cell 156.

Referring again to FIG. 3A, the protection and access circuit 137 is formed during MR read element semiconductor fabrication, so that the RSE 138 is formed in conjunction with the formation of the MR sensor 136. It will be appreciated that in the manufacturing process used to manufacture a data storage device such as 100 in FIG. 1, a number of steps are applied at the component and assembly levels. That is, the formation of the access circuit 137 is engaged before any risk of damage from the manufacturing process, whether before or after the formation of the MR sensor 136.

For example, the MR sensors 136 will be initially fabricated on a wafer in which perhaps thousands of nominally identical sensors (and associated RSEs) are initially formed. The sensors (and RSEs) will be separated into individual circuits and assembled onto associated sliders (such as 134 in FIG. 2B) to form transducer assemblies. The transducers may in turn be incorporated into head-gimbal assemblies (HGAs), and the HGAs incorporated into head-stack assemblies (HSAs), such as the actuator 114 in FIG. 1. The HSAs will then be installed into the drive so that the transducers 112 are merged with the storage media 110, and the data storage device 100 will be ready for device level verification.

At each step along the way, it may be desirable to periodically test or otherwise verify the operation of the MR sensor elements, since rework and scrap costs will increase the longer defective sensors are allowed to progress through the manufacturing process. Similarly, it is desirable to minimize the risk of damage due to ESD and EOS effects during such processing, until such time that the HSAs are installed and placed in an operational mode in the device.

Accordingly, the circuit 137 is selectively reconfigurable between a protection (non-operational) mode and an access (operational) mode. Generally, the protection mode is utilized at such times that the MR sensor element is in a non-operational state, such as during the foregoing fabrication and manufacturing process steps. The access mode is utilized at such times that the MR sensor element is placed in an operational state, such as during the aforementioned testing or verification steps, as well as during subsequent device operation.

As explained in greater detail below, the RSE 138 of FIG. 3A is programmed to the low resistance ($R_L$) state when the circuit 137 is in the non-operational mode. The resistance of the RSE 138 in the low resistance state is selected to be lower than the nominal resistance of the MR sensor 136. In this way, any ESD or EOS events that induce currents through the circuit will tend to flow through the RSE 138 to the reference line (ground) 146. This energy bleed path reduces the risk that damaging currents, overvoltages, etc. will be applied to the MR sensor 136.

Correspondingly, the RSE 138 is programmed to the high resistance ($R_H$) state when the circuit 137 is in the operational mode. When in the high resistance state, the RSE will essentially allow applied currents to flow through the MR sensor 136, allowing the operation of the sensor to be verified.

The respective resistances of the MR sensor 136 and RSE 138 will vary depending on the requirements of a given application. For reference, in some embodiments the nominal resistance $R_{MR}$ of the sensor 136 may be on the order of 1,000 to 2,000 ohms (1KΩ-2KΩ). The programmed low resistance $R_L$ of the RSE 138 may be significantly less than the resistance $R_{MR}$ of the sensor 136, such as around 150Ω. The programmed high resistance RH of the RSE 138 may be several orders of magnitude greater than the resistance $R_{MR}$ of the sensor 136, such as around 1,000,000 ohms (1MΩ). Other relative and absolute values of resistance can readily be used, so the foregoing values are merely exemplary and are not limiting. It will be appreciated that the RSE 138 can be repetitively programmed between the low and high resistance states (and back again) any number of times without incurring wear or other degradation to the RSE 138 or sensor 136.

Figure 4:
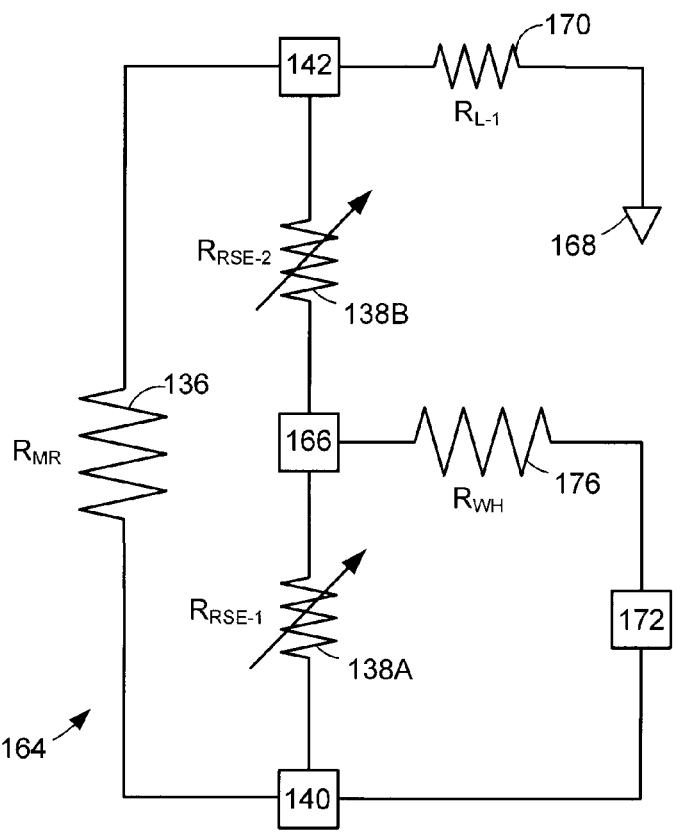
FIG. 4 generally illustrates an alternative protection and access circuit in accordance with various embodiments of the present invention.

Another embodiment for a protection and access circuit is provided in FIG. 4, denoted at 164. The sense element 136 as well as the first and second terminals 140 and 142 are substantially similar to the components shown in FIG. 3A. A first resistive sense element (RSE) 138A is connected in parallel with the sense element 136. In FIG. 4, a second RSE 138B is additionally connected in parallel with the sense element 136, and in series with the first RSE 138A. A third terminal 166 is disposed between the first and second RSEs 138A, 138B. The respective first and second RSEs 138A, 138B are further shown to have reprogrammable resistances $R_{RSE-1}$ and $R_{RSE-2}$. It is contemplated that both of the $R_{RSE-1}$ and $R_{RSE-2}$ resistances will be programmed high during the operational mode, and both will be programmed low during the non-operational mode.

A ground 168 is connected to the second terminal 142 and has a ground line resistance $R_{L-1}$ 170 as before to allow ESD and EOS energy to be drained from the control circuitry 164. A fourth terminal 172 is connected in parallel with the respective terminals 140 and 166. A low resistance conduction path extends from the fourth terminal 172 to the first terminal 140. A writer heater element 176 is connected between the fourth terminal 172 and the third terminal 166.

The writer heater 176 has a resistance $R_{WH}$ and can be characterized as an impedance element through which current is passed to alter the temperature of the transducer 112. This can be useful, for example, in improving operational performance of the transducer 112 by adjusting the fly height of the slider 132 during operation through thermal expansion of the slider.

It will be noted that the circuit 164 in FIG. 4 is configured between the operational and non-operational modes by selectively programming the respective RSEs 138A, 138B between the low and high resistive states. When the RSEs 138A, 138B are in the low resistive state, a bleed energy path is provided through the respective RSEs to the ground level 168, increasing the ability of the circuit 164 to withstand damaging events to the MR sensor 136.

Figure 5:
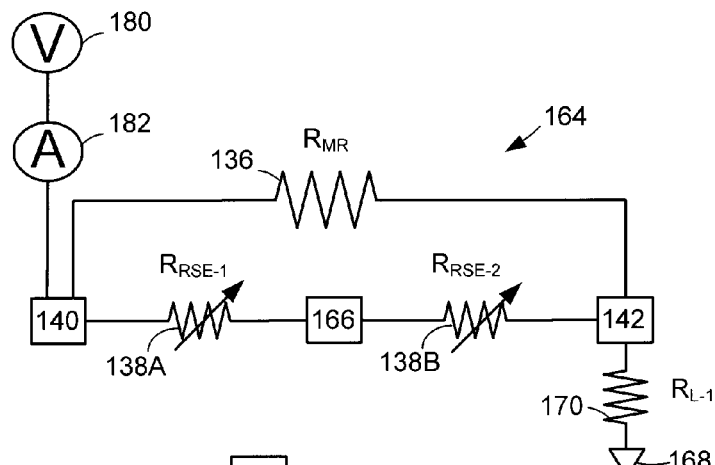
FIG. 5 shows the circuit of FIG. 5 configured to perform a testing operation upon the sensor.

FIG. 5 shows the circuit 164 of FIG. 4 to be in the operational mode to facilitate a test operation upon the MR sensor 136. It is contemplated that the test operation in FIG. 5 is periodically carried out at various times during fabrication and manufacturing when it is desirable to verify continued proper operation of the MR sensor 136. The RSEs 138A, 138B are each placed in the high resistance state to facilitate such testing.

While a variety of techniques can be used to verify the MR sensor 136, in some embodiments a voltage source 180 is coupled to a selected terminal, such as the first terminal 140 as shown. A current flows from the voltage source 180, through the MR sensor 136 and to ground 168. Because the line resistance $R_{L-1}$ is negligible, the magnitude of the current will be substantially established in relation to the resistance of the MR sensor 136. The resistance of the MR sensor 136 can thus be determined to be within acceptable tolerances by monitoring the magnitude of the current, such as via an ammeter 182. The detection of an out of tolerance current magnitude, such as resulting from an open or short through the MR sensor 136, can be readily detected. Hence, defective MR sensors 136 can be readily identified and rejected from the manufacturing process.

Figure 6:
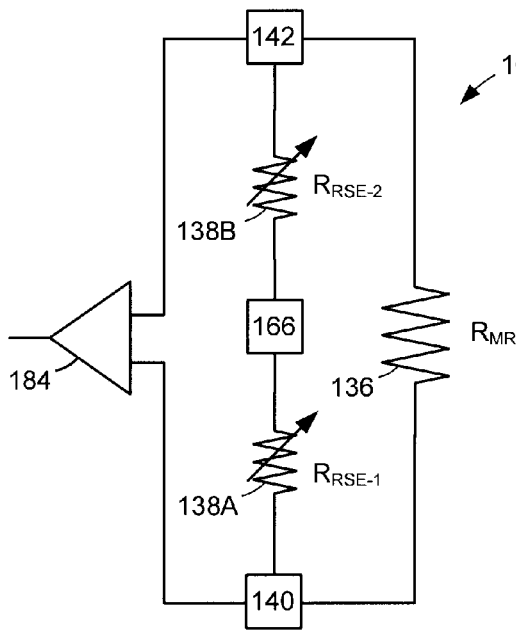
FIG. 6 shows the circuit of FIG. 5 configured to perform a data access operation using the sensor.

FIG. 6 shows the control circuit 164 in another operational mode, such as during normal operation of the device 100. As before, the RSEs 138A, 138B are placed into the high resistive state to allow electrical access to the MR sensor 136. In FIG. 6, it is contemplated that an MR read bias current is passed through the MR sensor 136 from a suitable source (not shown) and the MR sensor 136 is placed adjacent a magnetic field, such as adjacent magnetic flux transitions on the associated media surface (FIG. 1).

A sense amplifier 184 (such as in the preamp 130) is coupled across the terminals 140, 142 to sense changes in voltage across the MR sensor 136. The operation depicted in FIG. 6 can thus represent normal operation of the device 100, or can represent a device level testing operation where a selected test pattern is sensed by the MR sensor 136 to verify correct operation.

Figure 7:
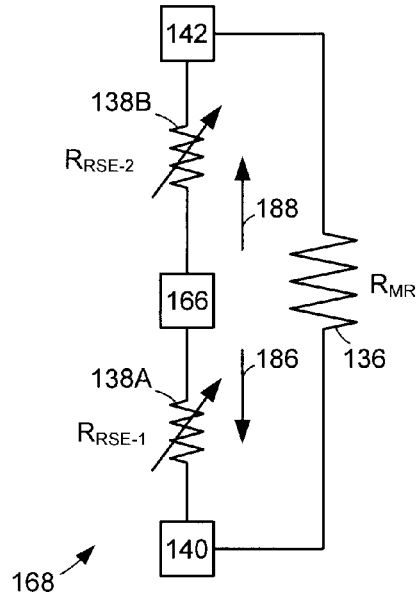
FIG. 7 generally illustrates a manner in which the circuit of FIG. 5 can be repetitively reprogrammed in accordance with the various embodiments of the present invention.

FIG. 7 shows portions of the control circuitry 164 of FIG. 4 to illustrate various manners in which the RSEs 138A, 138B can be repetitively reprogrammed between the high and low resistive states. Generally, care should be taken to ensure that programming currents do not inadvertently induce damage to the MR sensor 136. It will be noted that such programming currents (and associated voltages) may exceed the safe threshold values that the MR sensor 136 can sustain without damage. Accordingly, the following discussion of programming techniques is merely exemplary and are not limiting.

In some embodiments, the RSEs 138A, 138B are connected such that the application of a suitable write voltage to the center terminal 166 will cause respective programming currents 186, 188 to flow through the respective elements. For example, connections can be made to the circuit 164 such that the first and third terminals 140, 142 are connected to the reference line (ground), and voltage is applied to the center terminal 166. This technique can be useful when the RSEs 138A, 138B are initially in the low resistive state. The currents thus cause respective transitions of the resisitive states $R_{RSE-1}$ and $R_{RSE-2}$ from $R_L$ to $R_H$. The transitions in resistive state may not take place simultaneously, but this is not contemplated as being of concern, since once the first RSE switches to the high resistive state, very little current will thereafter flow through that RSE element.

Continuing with the preceding example, one way in which the RSEs 138A, 138B can be reprogrammed back to the respective low resistance $R_L$ states is through application of write voltages to the respective first and second terminals 140, 142, and a connection of the center terminal 166 to ground. In this way, the write voltages induce write currents through the RSEs 138A, 138B in directions opposite that of currents 186, 188 in FIG. 7 to program the cells in the low resistance state.

It can be appreciated by one skilled in the art that the RSE 138A and 138B can be programmed and reprogrammed with various stimuli including the application of a write current.

It may be desirable to establish a high impedance across the MR sensor 136 during this operation, such as by the connection of the inputs of an operational amplifier (op amp) across the MR sensor 136. These points can be accessed, for example, through the use of the first and second terminals 140, 142, or through the use of additional terminals (not shown) between the terminals 140, 142 and the MR sensor 136. Other methodologies for safely and repetitively reprogramming the RSEs 138A, 138B in both directions (i.e., from low to high and high to low) will readily occur to the skilled artisan in view of the foregoing discussion. In other embodiments, the RSEs 138A, 138B are configured to be repetitively reprogrammed by applying write currents in a single direction.

It is contemplated that the RSEs 138A, 138B will serve to provide protection against ESD and EOS for the MR sensor 136 until such time that the sensor 136 is finally installed in its final configuration in the device 100, and will thereafter not be used during normal device operation. In such cases, the RSEs 138A, 138B are each permanently set in the high resistance state. As desired, additional elements such as fuses can be added to the circuit, such as shown for a control circuit 190 in FIG. 8.

Figure 8:
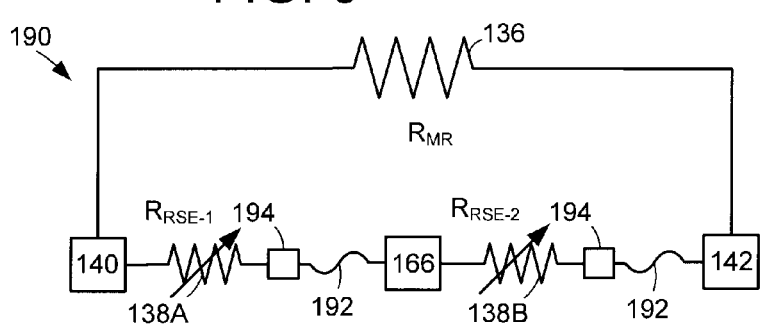
FIG. 8 shows another protection and access circuit in accordance with the various embodiments of the present invention.

In FIG. 8, a fixed fuse 192 and secondary terminal 194 is provided in series with each of the RSEs 138A, 138B. The secondary terminals 194 allow further precision in directing current through either the fixed fuse 192 alone or in combination with the in-line RSE 138A or 138B. The fixed fuse 192 can take the form of various components that maintain a low resistance (shunt) and are one-time configurable to a high resistive state (open). Thus, the addition of fixed fuses 192 and secondary terminals 194 increases the accuracy of possible current paths through the control circuitry 190. Once the sensor 136 has been installed, appropriate currents can be applied to the fuses between the respective terminals to establish permanent open circuits adjacent the RSEs 138A, 138B.

In other embodiments, however, the RSEs 138A, 138B continue to be selectively employed during device operation. For example, the device 100 can be configured for placement into a protective state, in which case the transducers 112 are safely parked (such as on a ramp structure) and the RSEs 138A, 138B are programmed low, thereby providing protection for the sensors 136 from EOS and other types of events.

Figure 9:
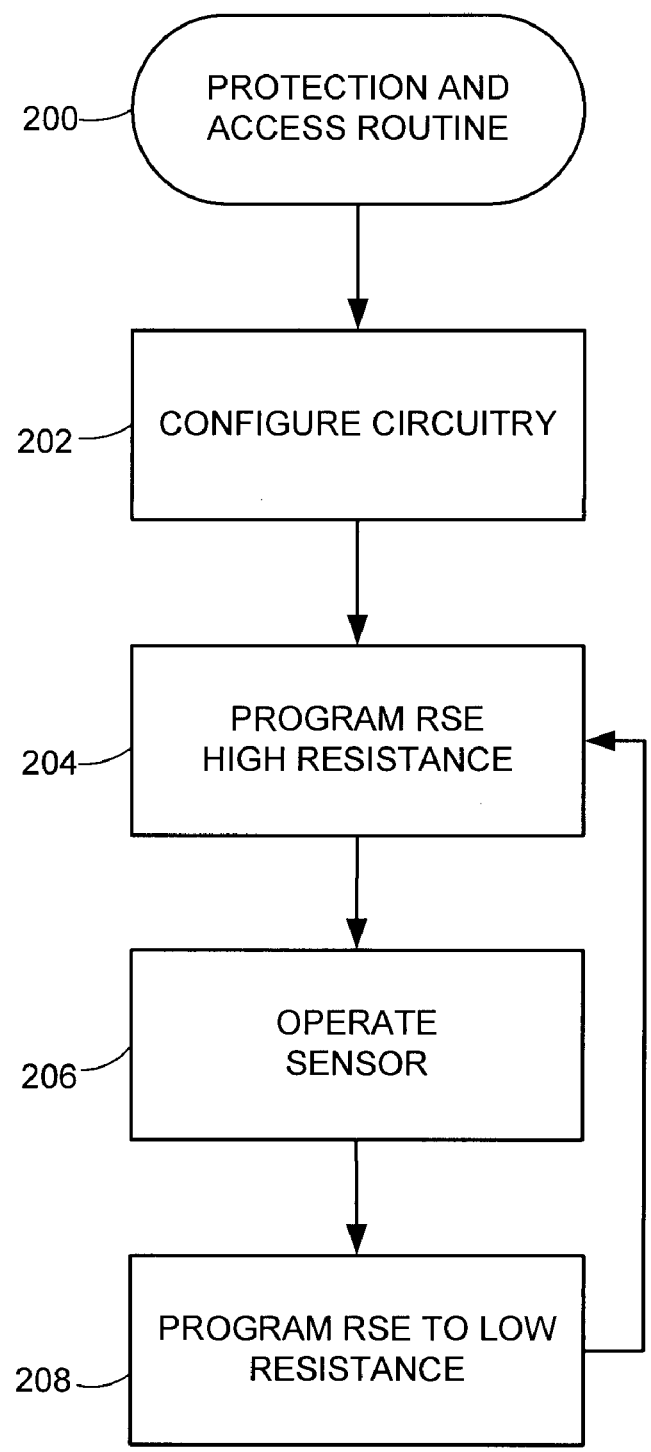
FIG. 9 displays a flow diagram for a routine carried out in accordance with various embodiments of the present invention.

FIG. 9 displays a flow diagram of a protection and access routine 200 performed in accordance with various embodiments of the present invention. Various functions of the routine 200 include, but are not limited to, testing, data reading, and sense element protection. The control circuitry is configured to correspond to the selected function in step 202. This can include initial provision of a sensor (such as the MR sensor 136) and at least one memory cell (such as the RSEs 138, 138A and/or 138B) connected in parallel with the sensor for protection of the sensor during non-operational modes.

In step 204, the at least one RSE 138 is programmed via a signal to switch to a high resistive state. It should be noted that the high resistive state could initially be present in one or all of the RSEs 138. In step 206, the sensor element 136 will be operated for various functions. It can be appreciated that the operation of the sense element can be for testing (as in FIG. 5) or general data access operations (as in FIG. 6), and these are generally carried out while the RSE(s) 138 are in a high resistance state.

As desired, the RSE(s) 138 are thereafter placed into a low resistance state, as indicated at step 208. This can be performed as described above to place the sensor in a protected state, so that any currents flowing to the first or second terminals 140 and 142 will be directed to the RSE 138 and not the sense element 136. The routine 200 of FIG. 9 can be cycled so that the RSE(s) are repetitively reprogrammed between the low and high resistance states as often as desired, depending on the requirements of the system.

As can be appreciated by one skilled in the art, the various embodiments illustrated herein provide advantages in reliability of electronic device manufacturing. The ability to isolate a sense element with the electronic selection of a resistive sense element improves efficiency and accuracy of testing. Moreover, significant time and power is saved by having a manufactured component that can be repetitively switched from a high resistance state to a low resistance state. However, it will be appreciated that the various embodiments discussed herein have numerous potential applications and are not limited to a certain field of electronic media or type of data storage devices.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   connecting a non-volatile memory element in parallel with a sensor element, the memory element configured to be repetitively reprogrammable between a high resistance state and a low resistance state;
   programming the memory element to said low resistance state to place the sensor element in a non-operational state; and
   reprogramming the memory element to said high resistance state to place the sensor element in an operational state.

2. The method of claim 1, further comprising testing the sensor element while the sensor element is in the operational state.

3. The method of claim 1, further comprising using the sensor element to transducer data from a storage medium while the sensor element is in the operational state.

4. The method of claim 1, wherein a plurality of memory elements are connected in parallel with the sensor element.

5. The method of claim 1, wherein the memory element is connected in series with a fuse.

6. The method of claim 1, wherein the low resistance state of the memory element is a lower resistance than the sensor element.

7. The method of claim 1, wherein multiple memory elements are connected in series with the sensor element.

8. The method of claim 1, wherein the memory element is programmed to a low resistance state in response to a protection mode.

9. The method of claim 1, wherein the memory element comprises a spin-torque transfer random access memory (STRAM) cell.

10. The method of claim 1, wherein the memory element comprises a resistive random access memory (RRAM) cell.

11. An apparatus comprising a non-volatile memory element connected in parallel with a sensor element, the memory element configured to be repetitively reprogrammable between a high resistance state and a low resistance state, wherein the memory element is programmed to the low resistance state when the sensor element is in a non-operational state and reprogrammed to the high resistance state when the sensor element is in an operational state.

12. The apparatus of claim 11, wherein the sensor comprises a read element of a data read/write transducer.

13. The apparatus of claim 11, wherein the low resistance state of the memory element provides an energy discharge path for electrostatic discharge (ESD) and electrical overstress (EOS) events.

14. The apparatus of claim 11, wherein a plurality of memory elements are connected in parallel with the sensor element.

15. The apparatus of claim 11, wherein the memory element is connected in series with a fuse.

16. The apparatus of claim 11, wherein the low resistance state of the memory element is a lower resistance than the sensor element.

17. The apparatus of claim 11, wherein multiple memory elements are connected in series with the sensor element.

18. The apparatus of claim 11, wherein the memory element is programmed to a low resistance state in response to a protection mode.

19. The apparatus of claim 11, wherein the memory element comprises a spin-torque transfer random access memory (STRAM) cell.

20. The apparatus of claim 11, wherein the memory element comprises a resistive random access memory (RRAM) cell.

* * * * *